Oct. 16, 1928.
B. HAYNES
TESTING OR DEMONSTRATING APPARATUS
Filed May 27, 1927
1,688,274
2 Sheets-Sheet 1
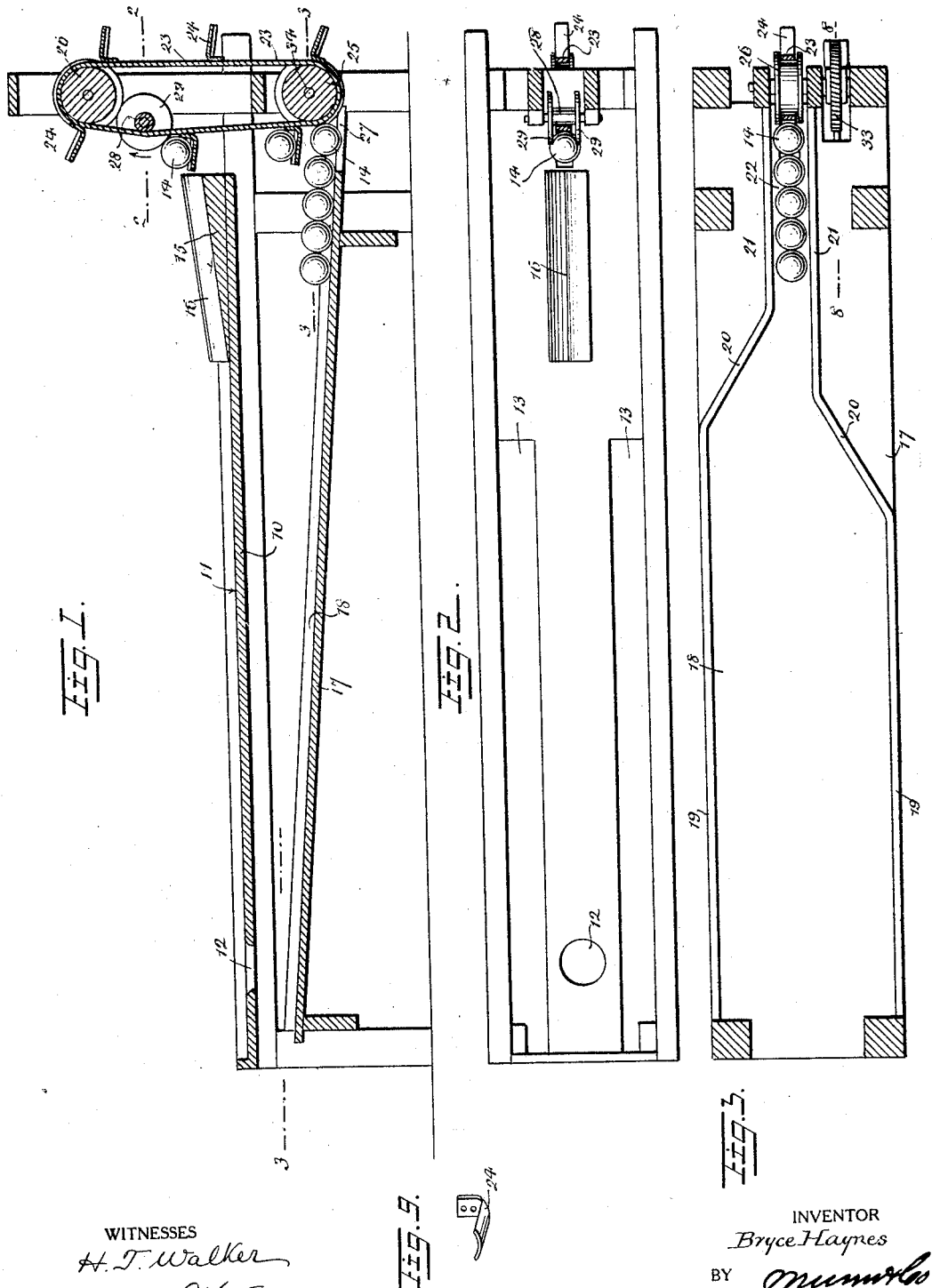
INVENTOR
Bryce Haynes
WITNESSES
BY
ATTORNEYS Oct. 16, 1928.
B. HAYNES
1,688,274
TESTING OR DEMONSTRATING APPARATUS
Filed May 27, 1927   2 Sheets-Sheet 2
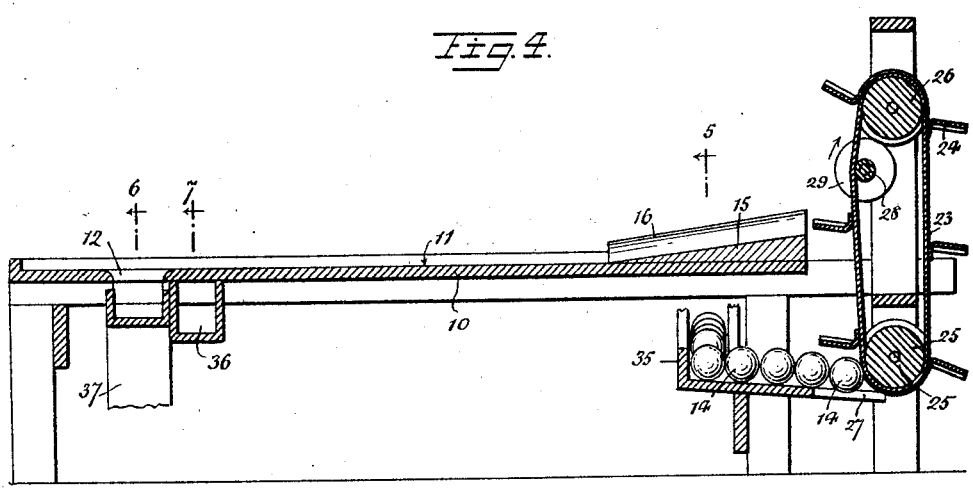
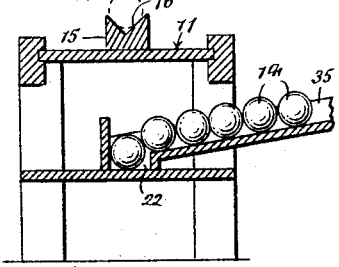 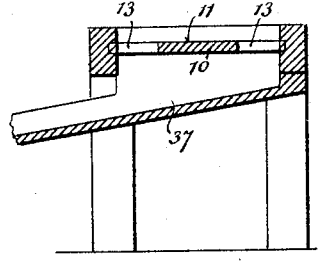 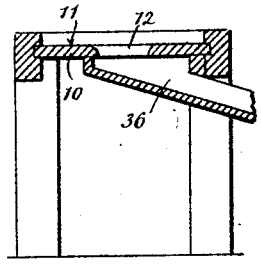
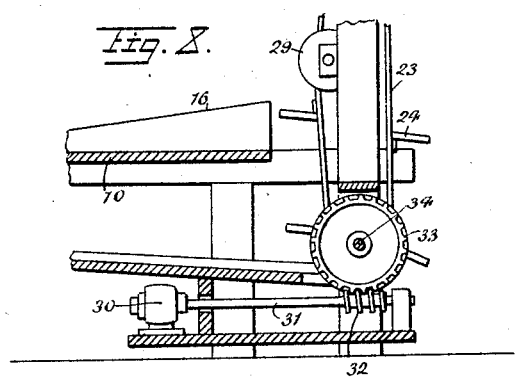
WITNESSES
H. T. Walker
Hugh H. Ott
INVENTOR
Bryce Haynes
BY Munn&Co.
ATTORNEYS Patented Oct. 16, 1928.

1,688,274

UNITED STATES PATENT OFFICE.

BRYCE HAYNES, OF NEW YORK, N. Y.

TESTING OR DEMONSTRATING APPARATUS.

Application filed May 27, 1927. Serial No. 194,744.

This invention relates to testing or demonstrating apparatus and has particular reference to a device for testing and demonstrating the rolling qualities of spheres or spherical objects, such as golf balls, or analogous spherical objects which are depended upon for the accuracy of their rolling quality.

In so far as known, no means has heretofore been devised for testing or demonstrating the rolling qualities of spherical objects and the present invention broadly comprehends an apparatus by means of which the interbalance of such objects may be tested and demonstrated through their rolling qualities.

The invention further comprehends an apparatus including a level or horizontal surface provided with a centrally disposed outlet opening adjacent one of its ends and side outlets extending from a point adjacent said end to a point adjacent its opposite end and upon the transverse center of the latter end of which means is provided for rolling the objects over the surface, whereby the objects having an accurate rolling quality gravitate from the surface through the central outlet opening, while the objects having inaccurate rolling quality leave the surface by virtue of the side outlets.

More specifically the invention comprehends in connection with a device having a testing surface as set forth, a ramp or incline disposed at the transverse center of the end remote from the outlets, upon which the objects are initially placed and from which they are guided and gravitationally roll on to the center of the surface.

As a still further object the invention resides in a mechanism for successively feeding the objects to the testing surface upon the upper end of the ramp or incline at predetermined intervals and distances apart.

The invention furthermore comprehends a device of this character, which by slight variation may be made to separate objects having accurate and inaccurate rolling qualities, or for returning all of the objects to the feeding mechanism for repetition of the testing of the same for use as a display or advertising device.

Other objects reside in the comparative simplicity of construction of the apparatus, the economy with which the same may be produced and operated and the general efficiency derived therefrom.

With the above recited and other objects in view, reference is had to the following description and accompanying drawings in which there is exhibited one example or embodiment of the invention, while the appended claims define the actual scope of the invention.

In the drawings—

Figure 1 is a longitudinal sectional view through the apparatus, illustrating the same used in the capacity of a demonstrating or advertising device;

Fig. 2 is a sectional plan view thereof;

Fig. 3 is a similar sectional view taken approximately on the line 3—3 of Fig. 1;

Fig. 4 is a view similar to Fig. 1, illustrating the use of the device for testing and separating the objects;

Fig. 5 is a transverse sectional view taken approximately on the line 5—5 of Fig. 4;

Fig. 6 is a transverse sectional view taken approximately on the line 6—6 of Fig. 4;

Fig. 7 is a similar view taken approximately on the line 7—7 of Fig. 4;

Fig. 8 is a fragmentary longitudinal sectional view taken approximately on the line 8—8 of Fig. 3;

Fig. 9 is a detail perspective view of one of the flights.

Referring to the drawings by characters of reference, 10 designates a member or board of substantially elongated rectangular formation which is supported or constructed in such a manner as to provide an upper surface 11 which is level or horizontal. Adjacent one of its ends, which will hereinafter be termed the forward end, the member 10 is provided with an outlet opening 12 therethrough which affords an outlet for objects moving over the surface 11. The opposite sides of the member 10 are provided with cutaway portions 13 extending from the said forward end to a point spaced from the opposite or rear end to provide side outlets. Suitable means is provided adjacent the rear end of the member 10 on the upper surface 11, for guiding the placement of the spherical objects 14 at the transverse center of the upper end for rolling over the surface 11 toward the forward end thereof. If the spherical object rolls true, it is obvious that the same will gravitate through the central outlet opening 12, whereas if the spherical object does not possess true or accurate rolling qualities, the same will roll off toward either side edge of the member 10 and will consequently gravitate from the surface 11 by virtue of the side outlets 13, thus effectually testing the rolling qualities of the objects 14 which are subjected to the test heretofore described. The means for gaging the placement of the objects 14 and which functions at the same time for initially imparting to the object the desired rolling momentum, consists preferably of a ramp 15 which is formed with a longitudinal groove 16 in its upper surface, the said upper surface being disposed at an inclination in a direction from the rear to the forward end of the member 10.

In use of the device for displaying or demonstrating the testing of the rolling qualities of the objects 14, such as for advertising purposes, a subterposed member 17 supported or constructed in such a manner as to provide an inclined upper surface 18, is employed which underlies the member 10 and the outlets 12 and 13 thereof. The surface 18 of the member 17 is inclined downwardly from the forward to the rear end of the device, and the member 17 is provided with upstanding marginal side flanges 19 from its upper end to a point slightly spaced from its lower end where the side flanges are formed with inwardly converging portions 20 which merge into parallel relatively closer spaced portions 21 which define a chute 22 of slightly greater width than the diameter of the objects 14. In order to provide means for successively feeding the objects received in the chute on to the ramp 15, an endless conveyor including a belt 23 having flights 24, is trained around vertically spaced guides 25 and 26 preferably in the nature of flanged drums or rollers. The lower end of the chute is provided with a central portion 27, which is of lesser width than the diameter of the spherical objects 14 and which is of sufficient width and size to allow for the passage of the flights 24 therethrough. Under this arrangement the lowermost object 14 in the chute 22 will be disposed directly in the path of movement of the flights 24, which flights at the point of contact or engagement with the objects 14, are disposed at a slightly upward and outward inclination as well as having an upper laterally concave face. In order to provide means for discharging the objects 14 from the flights as they are disposed in substantial registry with the uppermost end of the ramp, a sheave 28 is provided over which one of the conveyor belt leads 23 is trained, to impart turning motion thereto. The flanges 29 of the sheave peripherally engage the object 14 and roll the same therefrom into the groove 16 on the upper end of the ramp from whence it is obvious that the same will gravitate downwardly and on to the surface 11 of the member 10. In this form of the device where it is employed for display or demonstration purposes, it is obvious that the objects that have accurate rolling qualities will roll centrally over the surface 11 where they will gravitate through the central opening 12, while those which have inaccurate rolling qualities will gravitate from the surface 11 by virtue of the side outlets 13. The accurate and inaccurate objects will gravitate on to the upper surface 18 of the lower member 17, from whence they will be conveyed back to the chute and subsequently be picked up, elevated, and discharged by the conveying mechanism. The conveying mechanism may be operated in any suitable manner and for the purpose of illustration a motor 30 is shown, the motor shaft 31 of which is provided with a worm gear 32 meshing with a worm wheel 33 on a shaft 34 to which the lower guide or roller 25 of the conveyor is keyed.

In the use of the invention purely for testing purposes, the only difference resides in substituting for the lower member 17, an inlet trough 35 communicating with the chute 22, which trough is disposed laterally from the device for the feeding of the objects 14 to the conveying mechanism. This form further includes the provision of separate receiving troughs 36 and 37 for gravitationally receiving through the end outlet 12 and side outlets 13 respectively, the objects so as to separate the ones with accurate rolling qualities from the ones with inaccurate rolling qualities.

If desired, the device may be covered and concealed by a suitable housing for exposing only the testing surface 11 and its outlets.

What is claimed is:

1. A device for testing or demonstrating the rolling qualities of spherical objects, comprising a member having a horizontal surface provided with a centrally disposed outlet adjacent one of its ends and side outlets extending from a point adjacent said end to a point adjacent its opposite end, means for rolling the objects upon the transverse center of said latter end toward the outlet end, said means consisting of a ramp having an inclined upper surface and disposed at the transverse center of one end of the member, and mechanism for receiving the objects from the outlets and successively feeding the same on to the upper end of the ramp.

2. A device for testing or demonstrating the rolling qualities of spherical objects, comprising a member having a horizontal surface provided with a centrally disposed outlet adjacent one of its ends and side outlets extending from a point adjacent said end to a point adjacent its opposite end, means for rolling the objects upon the transverse center of said latter end toward the outlet end, said means consisting of a ramp having an inclined upper surface and disposed at the transverse center of one end of the member, and mechanism for receiving the objects from the outlets and successively feeding the same on to the upper end of the ramp, said mechanism including a conveyor having flights.

3. A device for testing or demonstrating the rolling qualities of spherical objects, comprising a member having a horizontal surface provided with a centrally disposed outlet adjacent one of its ends and side outlets extending from a point adjacent said end to a point adjacent its opposite end, means for rolling the objects upon the transverse center of said latter end toward the outlet end, said means consisting of a ramp having an inclined upper surface and disposed at the transverse center of one end of the member, mechanism for receiving the objects from the outlets and successively feeding the same on to the upper end of the ramp, said mechanism including a conveyor having flights, and means for discharging the objects from the flights on to the upper end of the ramp.

4. A device for testing or demonstrating the rolling qualities of spherical objects, comprising a member having a horizontal surface provided with a centrally disposed outlet adjacent one of its ends and side outlets extending from a point adjacent said end to a point adjacent its opposite end, means for rolling the objects upon the transverse center of said latter end toward the outlet end, said means consisting of a ramp having an inclined upper surface and disposed at the transverse center of one end of the member, mechanism for receiving the objects from the outlets and successively feeding the same on to the upper end of the ramp, said mechanism including a conveyor having flights, and means operable by the conveyor means for discharging the objects from the flights on to the upper end of the ramp.

5. A device for demonstrating the rolling qualities of spherical objects comprising a putting board having substantially horizontal surface provided with a centrally disposed outlet adjacent one end thereof to receive objects having accurate rolling qualities and side outlets to receive balls having inaccurate rolling qualities, and means associated with the other end of the board for rolling the objects upon the transverse center of the board and towards the opposite end and outlet, and at such a speed that the objects having accurate rolling qualities will be directed into the centrally disposed outlet.

BRYCE HAYNES.